(12) United States Patent
Ouyang et al.

(10) Patent No.: US 9,709,736 B2
(45) Date of Patent: Jul. 18, 2017

(54) RIGHT-ANGLE WAVEGUIDE BASED ON SQUARE-CYLINDER-TYPE SQUARE-LATTICE PHOTONIC CRYSTAL AND SINGLE COMPENSATION SCATTERING CYLINDER WITH HIGH REFRACTIVE INDEX

(71) Applicant: Zhengbiao Ouyang, Shenzhen (CN)

(72) Inventors: Zhengbiao Ouyang, Shenzhen (CN); Hao Huang, Shenzhen (CN)

( * ) Notice: Subject to any disclaimer, the term of this patent is extended or adjusted under 35 U.S.C. 154(b) by 0 days.

(21) Appl. No.: 15/395,263

(22) Filed: Dec. 30, 2016

(65) Prior Publication Data

US 2017/0108645 A1 Apr. 20, 2017

Related U.S. Application Data

(63) Continuation of application No. PCT/CN2015/090901, filed on Sep. 28, 2015.

(30) Foreign Application Priority Data

Sep. 29, 2014 (CN) .......................... 2014 1 0515361

(51) Int. Cl.
*G02B 6/12* (2006.01)
*G02B 6/122* (2006.01)
*G02B 6/125* (2006.01)

(52) U.S. Cl.
CPC ........... *G02B 6/1225* (2013.01); *G02B 6/125* (2013.01)

(58) Field of Classification Search
CPC .............................. G02B 6/1225; G02B 6/125
See application file for complete search history.

(56) References Cited

U.S. PATENT DOCUMENTS

2006/0140539 A1* 6/2006 Lee ........................ B82Y 20/00
385/43

* cited by examiner

*Primary Examiner* — Sung Pak
*Assistant Examiner* — Hoang Tran
(74) *Attorney, Agent, or Firm* — Wayne & King LLC

(57) ABSTRACT

A right angle waveguide having a square rod-type square lattice photonic crystal and a single compensation scattering rod having a high refractive index. The right angle waveguide is a photonic crystal formed from first dielectric rods having a high refractive index arranged in a background dielectric having a low refractive index according to a square lattice. In the photonic crystal, one row and one column of the first dielectric rods having the high refractive index are removed to form the right angle waveguide. A second dielectric rod having a high refractive index is arranged at a corner of the right angle waveguide, the second dielectric rod being the compensation scattering rod. The first dielectric rods are square rods having the high refractive index. The right angle waveguide has extremely low reflectance and a very high transmission rate, and facilitates large-scale optical path integration.

8 Claims, 2 Drawing Sheets

RIGHT-ANGLE WAVEGUIDE BASED ON SQUARE-CYLINDER-TYPE SQUARE-LATTICE PHOTONIC CRYSTAL AND SINGLE COMPENSATION SCATTERING CYLINDER WITH HIGH REFRACTIVE INDEX

CROSS-REFERENCE TO RELATED APPLICATIONS

This application is a continuation of International Patent Application No. PCT/CN2015/090901 with a filing date of Sep. 28, 2015, designating the United States, now pending, and further claims priority to Chinese Patent Application No, 201410515361.X with a filing date of Sep. 29, 2014. The content of the aforementioned applications, including any intervening amendments thereto, are incorporated herein by reference.

TECHNICAL FIELD

The present invention relates to a photonic crystal bending waveguide, and in particular relates to a right-angle waveguide based on a square-cylinder-type square-lattice photonic crystal and a single compensation scattering cylinder with high refractive index.

BACKGROUND OF THE PRESENT INVENTION

In 1987, E. Yablonovitch from a Bell laboratory of the United States, who was discussing about how to inhibit spontaneous radiation, and S. John from Princeton University, who was discussing about a photon localization, respectively and independently proposed the concept of photonic crystal (PhC) The PhC is a material structure formed in a way that dielectric materials are periodically arranged in space and an artificial crystal which is composed of two or more than two materials with different dielectric constants. The PhC has stronger and flexible control capability for propagation of light and high transmission efficiency for linear transmission and, sharp right-angle transmission. If a line defect is introduced into the structure of the PhC, a light guiding channel is created, called as a photonic crystal waveguide (PCW), Even if the waveguide has a 90-degree corner, the waveguide only has a very little loss. Completely different from conventional waveguides with basic total internal reflection, the PCW mainly utilizes a waveguide effect of a defect state; a new photon, state is formed inside a photonic band gap (PBG) due to the introduction of the defect, while the photon state density deviating from the defect state is zero. Therefore, the PCW realizes light transmission in a defect mode, without causing mode leakage. The PCW is a basic device for forming optical integrated circuits, the right-angle PCW can improve the integration level of optical circuits, and the research related to right-angle PCWs has important significance for the development of the optical integrated circuits.

SUMMARY OF PRESENT INVENTION

The present invention aims at overcoming the defects in the prior art to provide a right-angle waveguide based on a square-cylinder-type square-lattice PhC and a single compensation scattering cylinder with high refractive index, and the right-angle waveguide has extremely low reflectance and very high transmission rate.

The aim of the prevent invention is realised through a technical solution below.

The right-angle waveguide based on said square-cylinder-type square-lattice PhC and said single compensation scattering cylinder with high refractive index according to the present invention is built in a PhC formed from first dielectric cylinders with high refractive index arranged in a background dielectric with low refractive index according to a square lattice. In the PhC, one row and one column of said first dielectric cylinders with high refractive index are removed to form said right-angle waveguide. A second dielectric cylinder with high refractive index is arranged at the corner of said right-angle waveguide; said second dielectric cylinder is said compensation scattering cylinder. Said, first dielectric cylinders are square cylinders with high refractive index.

Said second dielectric cylinder is an isosceles right triangle cylinder, an arch shaped cylinder, a square cylinder, a triangular cylinder, a polygonal cylinder of more than three sides, or a cylinder of which the outline of the cross section is a smooth closed curve.

Said second dielectric cylinder is the isosceles right triangle cylinder.

The material of said first dielectric cylinders with high refractive index is Si, gallium arsenide, titanium dioxide, or a different dielectric with refractive index of more than 2.

The material of said first dielectric cylinders with high refractive, index is Si, and the refractive index of Si is 3.4.

The material of said background dielectric with low refractive index is air, vacuum, magnesium fluoride, silicon dioxide, or a different dielectric with refractive index of less than 1.6.

Said background dielectric with low refractive index is air.

Said right-angle waveguide is a waveguide operating in a transverse electric (TE) mode.

The area of the structure of said right-angle waveguide is more than or equal to 7a*7a, and a is the lattice constant of the PhC.

PhC waveguide device of the present invention can be widely applied in various photonic or optical integrated devices. Compared with the prior art, said right-angle PCW according to the present invention has the positive effects below:

1. Said right-angle waveguide based on said square-cylinder-type square-lattice PhC and said single compensation scattering cylinder with high refractive index according to the present invention has extremely low reflectance and very high transmission rate, thereby providing a greater space for application of said right-angle PCW;

2. The structure of the present invention is based on multiple scattering theory, phase and amplitude compensations for reducing the reflectance and improving the transmission rate of optical waves transmitted in said structure are realized by said single compensation scattering cylinder with high refractive index, so as to reduce the reflectance and improve the transmission rate, and therefore, said structure can realize low reflectance and high transmission rate;

3. Said right-angle waveguide based on said square-cylinder-type PhC and said single compensation scattering cylinder with high refractive index according to the present invention can be used in design for large-scale optical integrated circuits; the optical circuits are concise and are convenient to design, and said right-angle waveguide facilitates large-scale integration of optical circuits;

4. Said right-angle waveguide based on said square-cylinder-type square-lattice PhC and said single compensation scattering cylinder with high refractive index according to the present invention can realize connection and coupling of different elements in optical circuits and among different optical circuits, thereby being favorable to lowering the cost.

DETAILED DESCRIPTION OF PREFERRED EMBODIMENTS

Specific implementation manners of the present invention are further illustrated in combination with the drawings.

Figure 1:
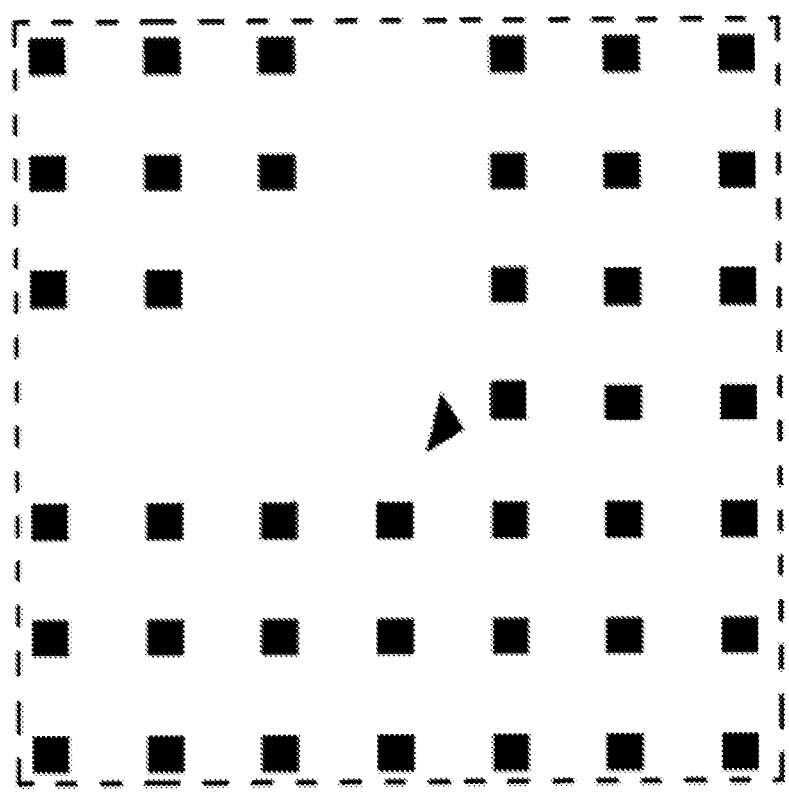
FIG. 1 is the schematic diagram of the core region of the structure of the right-angle waveguide based on a square-cylinder-type square-lattice PhC and a single compensation scattering cylinder with high refractive index according to the present invention.

As shown in FIG. 1, a right-angle waveguide based on a square-cylinder-type square-lattice PhC and a single compensation scattering cylinder with high refractive index according to the present invention is a PhC formed from said first dielectric cylinders with high refractive index arranged in a background dielectric with low refractive index according to square lattice. In said PhC, one row and one column of said first dielectric cylinders with high refractive index are removed to form the right-angle waveguide. A second dielectric cylinder with high refractive index is arranged at the corner of the right-angle waveguide, said second dielectric cylinder is a compensation scattering dielectric cylinder, and the compensation reflected waves generated by the second dielectric cylinder are offset by the intrinsic reflected waves in the waveguide without said compensation scattering dielectric; said compensation scattering dielectric cylinder is further adopted as: an isosceles right triangle cylinder, an arch shaped cylinder, a square cylinder, a triangular cylinder, a polygonal cylinder of more than three sides, or further a cylinder, of which the outline of the cross section is a smooth closed curve; said second dielectric cylinder (compensation scattering dielectric cylinder) is the isosceles right triangle cylinder; and the material of said first dielectric cylinders with high refractive index is respectively adopted as Si, gallium arsenide, titanium dioxide, or a different dielectric with refractive index of more than 2; and the material of the background dielectric with low refractive index is adopted as air, vacuum, magnesium fluoride, silicon dioxide, or a different dielectric with refractive index of less than 1.6.

Figure 2:
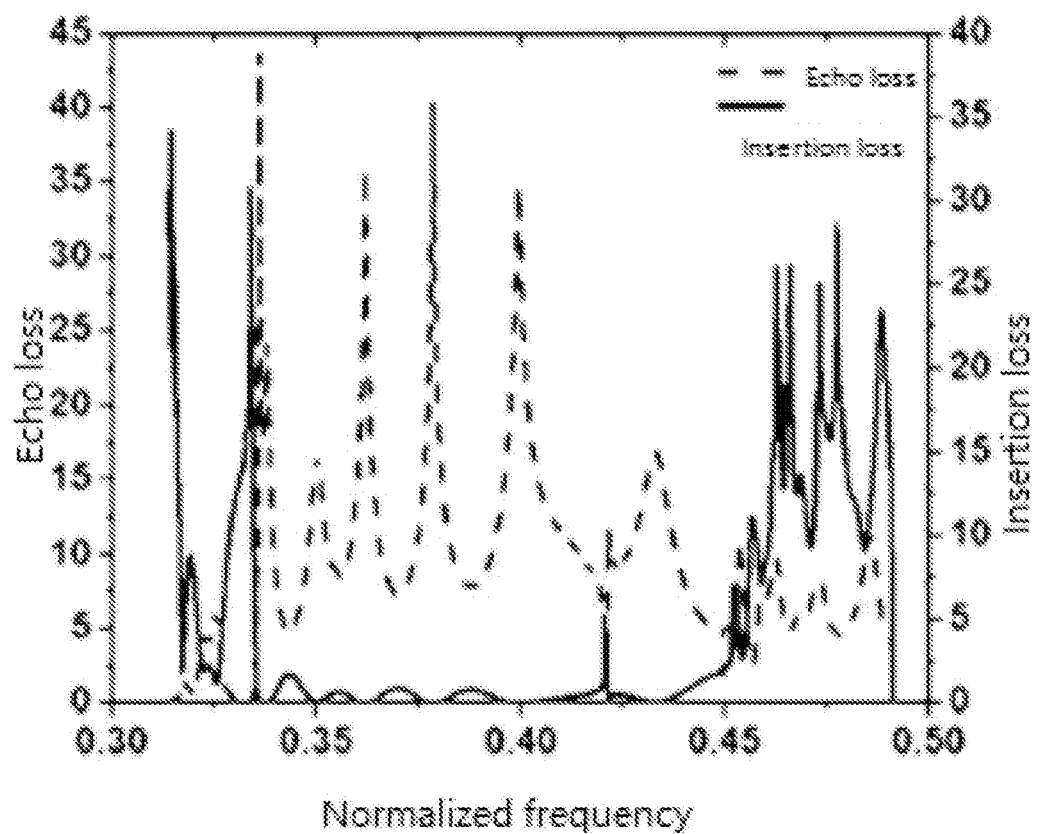
FIG. 2 is the normalized frequency-transmission characteristic diagram of the right-angle waveguide based on the square-cylinder-type square-lattice PhC and the single compensation scattering cylinder with high refractive index according to the present invention.

Six embodiments are shown below according to the above result:

Embodiment 1: the lattice constant of said square-lattice PhC is a; said first dielectric cylinders with high refractive index are adopted as square cylinders, and the side length of each square cylinder is 0.31a; the polarization of optical waves transmitted in the waveguide is TE form; said second dielectric cylinder is adopted as an isosceles, right triangle cylinder, and further, the length of the right-angle side of the isosceles right triangle compensation scattering dielectric cylinder with high refractive index at the lower right corner is 0.34596a; the displacements of said isosceles right triangle compensation scattering dielectric cylinder in the X direction and in the Z direction measured from the original benchmark point are respectively 0.42733a and 0.53728a, and the rotation angle is 239.256044 degrees; the position of optical source in the X direction and in the Z direction measured from the coordinate origin is (−6.00a, 0); and the initial phase of incident light (the optical source) is 0 degree. The dielectric with high refractive index is Si, and the refractive index of Si is 3.4; and the background dielectric with low refractive index is air. The structure size of the right-angle waveguide formed in the PhC is 15a*15a, a return loss spectrum and an insertion loss spectrum of the right-angle waveguide formed in the PhC are then obtained and shown in FIG. 2, the horizontal axis of the figure is the operating frequency of the structure, the longitudinal axis part of the figure indicates transmission, the dash line in the figure indicates the return loss of the structure (defined as: LR=−10 log (PR/PI while the solid line in the figure indicates the insertion loss (defined as: LI=−10 log (PT/PI), wherein PI is the incident power of the structure, PR is the reflection power of the structure, and PT is the transmission power of the structure. At the normalized frequency of $0.336(\omega a/2\pi c)$, the maximum return loss and the minimum insertion loss of the right-angle waveguide formed in the PhC are 43.87 dB and 0.0022 dB.

Embodiment 2: the lattice constant a of said-square-lattice PhC is 0.5208 μm, so that the optimal normalized wavelength is 1.302 μm: said first dielectric cylinders with high refractive index are adopted as square cylinders, and the side length of each square cylinder is 0.161448 μm; the polarization of optical waves transmitted in the waveguide is TE form; said second dielectric cylinder is adopted as an isosceles right triangle cylinder, and further, the length of the right-angle side of the isosceles right triangle compensation scattering dielectric cylinder with high refractive index at the lower right corner is 0.18018 μm; the displacements of said compensation scattering dielectric cylinder in the X direction and in the Z direction measured from the original benchmark point are respectively 0.222556 μm and 0.279616 μm, and the rotation angle is 239.256044 degree; the position of an optical source measured from the coordinate origin in the X direction and in the Z direction is (−3.1248, 0) (μm); and the initial phase of incident light (the optical source) is 0 degree. The dielectric with high refractive index is silicon (Si), and the refractive index of Si is 3.4; and the background dielectric with low refractive index is air. The structure size of the right-angle waveguide formed in the PhC is 15a*15a, and the return loss and the insertion loss of the right-angle waveguide formed in the PhC are respectively 29.13046553 dB and 0.005406 dB.

Embodiment 3: the lattice constant a of said square-lattice PhC is 0.5208 μm, so that the optimal normalized wavelength is 1.55 μm; said first dielectric cylinders with high refractive index are adopted as square cylinders, and the side length of the square cylinder is 0.161448 μm; the polarization of optical waves transmitted in said waveguide is TE form; said second dielectric cylinder is adopted as an isoscles right triangle cylinder, and further, the length of the right-angle side of the isosceles right triangle compensation scattering dielectric cylinder with high refractive index at the lower right corner is 0.13018 μm; the displacements of said compensation scattering dielectric cylinder in the X direction and in the Z direction measured from original benchmark point are respectively 0.222556 μm and 0.279616 μm, and the rotation angle is 239.256044 degrees; the position of optical source measured the coordinate origin in the X direction and in the Z direction is (−3.1248, 0) and the initial phase of incident light (the optical source) is 0 degree. The dielectric with high refractive index is silicon (Si), and the refractive index of Si is 3.4; and the background dielectric with low refractive index is air. The structure size of the right-angle waveguide formed in the PhC is 15*15a, and the maximum return loss and the minimum insertion loss of said right-angle waveguide formed in the PhC are respectively 43.87 dB and 0.0022 dB.

Embodiment 4: the lattice, constant a of a square-lattice PhC is 0.336 µm, so that the optimal normalized wavelength is 1.00 µm: said first dielectric cylinders with high refractive index are adopted as square cylinders, and the side length of, each square, cylinder is 0.10416 µm; the polarization of optical waves transmitted in a waveguide is TE form; said second dielectric cylinder is adopted as an isosceles right triangle cylinder, and further, the length of the right-angle side of the isosceles right triangle compensation scattering dielectric cylinder with high refractive index at the lower right corner is 0.116243 µm: the displacements of the isosceles right triangle compensation scattering dielectric cylinder in the X direction and in the Z direction measured from the original benchmark point are respectively 0.143583 µm and 0.180526 µm, and the rotation angle is 239.256044 degree; the position of optical source measured from the coordinate origin in the X direction and in the Z direction is (−2.016, 0) (µm); and the initial phase of incident light (optical source) is 0 degree. The dielectric with, high refractive index is silicon (Si), and the refractive index, of Si is 3.4; and the background dielectric with low refractive index is air. The structure size of the right-angle waveguide formed in the PhC is 15a*15a, and the maximum return loss and the minimum insertion loss of the right-angle waveguide formed in the PhC are respectively 43.87 dB and 0.0022 dB.

Embodiment 5: the lattice constant a of said square-lattice PhC is 0.336 µm so that the optimal normalized wavelength is 1.00 µm: said first dielectric cylinders with high refractive index are adopted as square cylinders, and the side length of the each square cylinder is 0.154157 µm; the polarization of optical waves transmitted in the waveguide is TE form; said second dielectric cylinder is adopted as an isosceles, right triangle cylinder, and further, the length of the right-angle side of said isosceles right triangle compensation scattering dielectric cylinder with high refractive index at the lower right corner is 0.172039 µm; the displacements of said isosceles right triangle compensation scattering dielectric cylinder in the X direction and in the Z direction measured from the original benchmark point are respectively 0.212503 µm and 0.267179 µm, and the rotation angle is 239.256044 degree; the position of optical source measured from, the coordinate origin in the X direction and in the Z direction is (−2.98368, 0) (µm); and the initial phase of incident light (the optical source) is 0 degree. The dielectric with high refractive index is silicon (Si) and the refractive index of Si is 3.4; and the background dielectric with low refractive index is air. The structure size of the right-angle waveguide formed in the PhC is 15a*15a, and the maximum return loss and the minimum insertion loss of the right-angle waveguide formed in the PhC are respectively 43.87 dB and 0.0022 dB.

Embodiment 6: the lattice constant a of said square-lattice PhC is 168 µm, so that the optimal normalized wavelength is 50 µm; said first dielectric cylinders with high refractive index are adopted as square cylinders, and the side length of each square cylinder is 52.08 µm: the polarization of optical waves transmitted in the waveguide is TE form; said second dielectric cylinder is adopted as an isosceles right triangle cylinder, and further, the length of the right-angle side of the isosceles right triangle compensation scattering dielectric cylinder with high refractive index at the lower right corner is 58.12128 µm; the displacements of the isosceles right triangle compensation scattering dielectric cylinder in the X direction and in the Z direction measured from the original benchmark point are respectively 71.79144 µm and 90.26304 µm, and the rotation angle is 239.256044 degree; the position of optical source measured from the coordinate origin in the X direction and in the Z direction is (−1008, 0) (µm); and the initial phase of incident light (optical source) is 0 degree. The dielectric with high refractive index is Si, and the refractive index of Si is 3.4; and the background dielectric with, low refractive index is air. The structure size of the right-angle waveguide formed in the PhC is 15a*15a, and the maximum return loss and the minimum insertion loss of the right-angle waveguide formed in the PhC are respectively 43.87 dB and 0.0022 dB.

The above detailed description is only for clearly understanding the present invention and should not be taken as an unnecessary limit to the present invention. Therefore, any modification made to the present invention is apparent for those skilled in the art.

We claim:

1. A right-angle waveguide based on a square-cylinder-type square-lattice photonic crystal and a single compensation scattering cylinder with high refractive index, characterized in that: said right-angle waveguide is built in a PhC formed from first dielectric cylinders with high refractive index arranged in a background dielectric with low refractive index according to a square-lattice; wherein said PhC, one row and one column of said first dielectric cylinders with high refractive index are removed to form said right-angle waveguide; a second dielectric cylinder with high refractive index is arranged at the corner of said right-angle waveguide; said second dielectric cylinder is the compensation scattering cylinder; and said first dielectric cylinders are square cylinders with high refractive index; wherein said second dielectric cylinder is an isosceles right triangle cylinder, an arch shaped cylinder, a square cylinder, a triangular cylinder, a polygonal cylinder of more than three sides, or a cylinder, of which the outline of the cross section is a smooth closed curve.

2. The right-angle waveguide based on said square-cylinder-type square-lattice photonic crystal and said single compensation scattering cylinder with high refractive index according to claim 1, characterized in that: said second dielectric cylinder is the isosceles right triangle cylinder.

3. The right-angle waveguide based on said square-cylinder-type square-lattice photonic crystal and said single compensation scattering cylinder with high refractive index according to claim 1, characterized in that: the material of said first dielectric cylinders with high refractive index is Si, gallium arsenide, titanium dioxide, or a different dielectric with refractive index of more than 2.

4. The right-angle waveguide based on said square-cylinder-type square-lattice photonic crystal and said single compensation scattering cylinder with high refractive index according to claim 3, characterized in that: the material of said first dielectric cylinders with high refractive index is silica, and the refractive index of Si is 3.4.

5. The right-angle waveguide based on said square-cylinder-type square-lattice photonic crystal and said single compensation scattering cylinder with high refractive index according to claim 1, characterized in that: the material of said background dielectric with low refractive index is air, vacuum, magnesium fluoride, silicon dioxide, or a different dielectric with refractive index of less than 1.6.

6. The right-angle waveguide based on said square-cylinder-type square-lattice photonic crystal and said single compensation scattering cylinder with high refractive index according to claim 5, characterized in that: said background dielectric with low refractive index is air.

7. The right-angle waveguide based on said square-cylinder-type square-lattice photonic crystal and said single compensation scattering cylinder with high refractive index according to claim 1, characterized in that: said right-angle waveguide is a waveguide operating in a TE mode.

8. The right-angle waveguide based on said square-cylinder-type square-lattice photonic crystal and said single compensation scattering cylinder with high refractive index according to claim 1, characterized in that the area of the structure of said right-angle waveguide is more than or equal to 7a*7a, and a is the lattice constant of said PhC.

\* \* \* \* \*